United States Patent Office 3,809,677
Patented May 7, 1974

3,809,677
STABILIZATION OF VINYL POLYMERS
Vincent Oakes, St. Helens, and Brian Rodney Iles, Liverpool, England, assignors to Interstab Limited, Liverpool, England
No Drawing. Continuation of abandoned application Ser. No. 193,158, Oct. 27, 1971, which is a division of application Ser. No. 877,857, Nov. 18, 1969, now Patent No. 3,665,024, dated May 23, 1972. This application Nov. 14, 1972, Ser. No. 306,207
Claims priority, application Great Britain, Nov. 22, 1968, 55,523/68
Int. Cl. C08f 45/62
U.S. Cl. 260—45.75 K          2 Claims

ABSTRACT OF THE DISCLOSURE

New organo-tin compounds, suitable for use as stabilizers for vinyl halide resins, are obtained by reacting a dialkyltin oxide, hydroxide, or dihalide with a monoester of a diol or an alkoxy or acyloxy alcohol with a mercapto-acid.

---

This is a continuation of copending application Ser. No. 193,158, filed Oct. 27, 1971, now abandoned, which in turn, is a divisional of copending application Ser. No. 877,857, filed Nov. 18, 1969, now Pat. No. 3,665,024, granted May 23, 1972.

This invention relates to the stabilization of vinyl polymers with organotin compounds, and to new organotin compounds suitable for use for this purpose.

Vinyl chloride polymers and copolymers are thermoplastic in nature and therefore have to be heated in order to soften them during fabrication operations such as calendering and extruding. Such heat is limited in degree and duration by the tendency of the resins to decompose. This decomposition leads to deterioration in the physical properties of the resin. It also results in severe darkening in color of the resin which prohibits its use in lightly colored or transparent articles. This latter property is obviously a major drawback to the use of PVC in many applications. In order to overcome this, several products have been suggested as stabilizers. In general these fall into three main classes, namely: lead salts, barium/cadmium soaps and organotin compounds.

Of these the organotin compounds are the most effective stabilizers, particularly when they contain tin sulphur bonds. Such products are commonly refered to as thiotins.

In our British specification No. 1,027,781 we demonstrated that advantages were to be gained by using dialkyltin salts derived from esters of triols or polyols with mercaptoacetic or beta-mercapto propionic acid. These salts were shown to be of particular advantage if there was at least one free hydroxyl group remaining in the ester from which the dialkyltin salt was formed. It was concluded that the free hydroxyl group had an important bearing on the course of the stabilization reaction although the manner in which it was effective was not known.

Products derived from esters of triols such as glycerol, trimethylol propane and polyols such as pentaerythritol, all suffer from one major drawback in that they can only be prepared as thick intractable products of a gummy plastic or elastomeric consistency. These difficulties not only rendered the product unattractive from a sales and handling viewpoint, but also made them difficult to manufacture with the required degree of consistency. Therefore although satisfactory products could be quite easily prepared in the laboratory it proved difficult to reproduce them consistently at full production level. These difficulties are thought to arise because of the potential polymeric nature of the resulting compounds. It is the purpose of this invention to provide a type of compound which is at least as good in performance as those described in British Specification No. 1,027,781, but does not suffer from the same handling and manufacturing difficulties of these compounds.

According to the invention, vinyl resins are stabilized by incorporating therein products obtained by reacting a dialkyltin oxide, hydroxide or dihalide with a monoester of a diol or an alkoxy or acyloxy alcohol with a mercapto-acid.

Examples of suitable diols are ethylene glycol, diethylene glycol, propylene glycol, dipropylene glycol. Suitable alkoxy alcohols include 2-methoxy-ethanol. Suitable acyloxy alcohols include 2-acetoxyethanol. Suitable mercapto-acids include mercapto-acetic acid (also known as thioglycolic acid) and beta-mercaptopropionic acid. The dialkyltin compounds may have alkyl groups of up to 10 carbon atoms, especially butyl or octyl groups.

The facts that the free hdryoxyl group of a diol ester can be replaced by an alkoxy group or an acyloxy group, and that compounds derived from diols such as diethylene glycol are very effective appears to indicate that the effective part of the molecule is the oxygen atom and not the free hydroxyl group. It is therefore thought that all types of alkoxy and acyloxy groups would be suitable as well as free hydroxyl groups. This would have the additional advantage that the production of thick intractable compounds would be virtually impossible.

An additional advantage of the new products is that they appear to be universally applicable to the different types of PVC available. There are two principal types of PVC available. The first of these is made by a suspension polymerization process and the second by an emulsion polymerization process. The two types of PVC differ markedly in their handling and stabilization characteristics. The new products described appear to be equally effective in both types of PVC and in this manner differ from products which have been described earlier.

The stabilizers according to the invention may be used in quantities of from 0.5% to 10% based on the weight of the vinyl resins.

The products of this invention can be prepared for example by reaction of the dialkyltin oxide with the mono-mercapto ester of the selected glycol or alcohol, or by reaction of a dialkyltin halide with the sodium salt of the ester.

The invention is illustrated by the following examples:

EXAMPLE 1

The selected glycol or alcohol (1 mol) and thioglycolic acid (1 mol) were refluxed together in toluene (150 ml.) in an apparatus fitted for azeotropic distillation and the reaction continued until water (1 mol) had been collected. The toluene was then removed under reduced pressure in a rotary evaporator, the ester being obtained in quantitative yield. This ester (1 mol) was then heated to 80° C. and dibuyltin oxide (0.5 mol) added slowly with stirring. When all had dispersed the temperature was increased to 110° C. and held there until all the water of reaction had been removed. The product was then filtered, using a filter aid, to afford the desired salt in approximately 98% yield in each instance.

Using this general technique the following compounds were prepared, each of which is thought to be a new compound.

| Compound | R.I. at 17° C. | Viscosity poise at 25° C. |
|---|---|---|
| Dibutyltin-bis-(ethylene glycol thioglycollate) | 1.5518 | 3.4 |
| Bu\\_  _/S—CH$_2$CO.O.CH$_2$CH$_2$OH<br>  Sn<br> /  \\_S—CH$_2$CO.O.CH$_2$CH$_2$OH<br>Bu | | |
| Dibutyltin-bis-(propylene glycol thioglycollate) | 1.5385 | 3.7 |
| Bu\\_  _/S—CH$_2$CO.O.CH$_2$—CH—OH<br>               CH$_3$<br>  Sn<br> /  \\_S—CH$_2$CO.O.CH$_2$—CH—OH<br>Bu             CH$_3$ | | |
| Dibutyltin-bis-(dipropylene glycol thioglycollate) | 1.5178 | 4.7 |
| Dibutyltin-bis-(2-methoxy ethyl thioglycollate) | 1.5258 | 0.65 |
| Bu\\_  _/S—CH$_2$CO.O.CH$_2$—CH$_2$OCH$_3$<br>  Sn<br> /  \\_S—CH$_2$CO.O.CH$_2$—CH$_2$OCH$_3$<br>Bu | | |
| Dibutyltin-bis-(2-acetoxyethyl thioglycollate) | 1.5138 | |
| Bu\\_  _/S—CH$_2$CO.O.C$_2$H$_4$.O.CO.CH$_3$<br>  Sn<br> /  \\_S—CH$_2$CO.O.C$_2$H$_4$.O.CO.CH$_3$<br>Bu | | |

| Compound | R.I. at 20° C. |
|---|---|
| Dibutyltin bis (ethylene glycol β mercapto propionate) | 1.5392 |
| Bu$_2$Sn(SCH$_2$CH$_2$C(=O)—OCH$_2$CH$_2$OH)$_2$ | |
| Dioctyltin-bis-(ethylene glycol thioglycollate) | 1.5300 |
| Oct$_2$Sn(SCH$_2$C(=O)OCH$_2$CH$_2$OH)$_2$ | |
| Dibutyltin-bis-(triethylene glycol thioglycollate) | 1.5249 |
| Bu$_2$Sn(SCH$_2$C(=O)—O(CH$_2$CH$_2$O)$_2$CH$_2$CH$_2$OH)$_2$ | |
| Dibutyltin-bis-(1,4-butylene glycol thioglycollate) | 1.5398 |
| Bu$_2$Sn(SCH$_2$C(=O)OCH$_2$CH$_2$CH$_2$CH$_2$OH)$_2$ | |

EXAMPLE 2

Di-n-butyltin oxide (24.8 g.) was dissolved in acetic anhydride (102 g.) at 80–90° C. to form dibutyltin diacetate. Ethylene glycol thioglycollate (272 g.) was added, and the mixture was distilled under reduced pressure, until no more acetic acid distilled off. The product was filtered to yield dibutyltin-bis-(ethylene glycol thioglycollate) in high yield.

EXAMPLE 3

Organotin compounds can be used for the stabilization of both rigid and plasticized P.V.C. The most rigorous examination is to test them in a rigid compound. This may be applied by compounding the stabilizer in the following formulation:

Suspension PVC _____ 100
Lubricant _____ 1
Stabilizer _____ 2

The above mixture is stirred together until reasonably homogeneous and then applied to a laboratory two roll mill which is heated to a temperature of 155° C. After approximately one minute the PVC will form a band around one of the rollers. The milling period is continued for five minutes after which time the resultant sheet is taken from the rolls at a thickness of approximately 50 thou. Samples of this sheet are then heated in a laboratory air circulation oven at a temperature of 185° C., and inspection samples withdrawn at ten minute intervals. The rate of degradation of the PVC sheet can be observed quite readily from the rate of color formation in the samples. Using this technique, the following results were obtained, the first three compounds being known compounds used for the comparison with the products of the invention:

| Product | Time to color formation (mins.) | | |
|---|---|---|---|
| | Slight yellow | Yellow | Black |
| Dibutyltin-bis-(octyl thioglycollate) | 30 | 60 | 80 |
| Dioctyltin-bis(octyl thioglycollate) | 30 | 70 | 90 |
| Dibutyltin-bis-(glyceryl thioglycollate) | 60 | 70 | 80 |
| Dibutyltin-(glyceryl-bis-thioglycollate) | 65 | 75 | 85 |
| Dibutyltin-bis-(ethylene glycol thioglycollate) | 70 | 80 | 90 |
| Dibutyltin-bis-(propylene glycol thioglycollate) | 65 | 75 | 90 |
| Dibutyltin-bis-(2-methoxy ethyl thioglycollate) | 70 | 80 | 90 |
| Dibutyltin-bis-(ethylene glycol β mercapto propionate) | 70 | 80 | 90 |
| Dibutyltin-bis-(triethylene glycol thioglycollate) | 50 | 60 | 8 |
| Dibutyltin-bis-(1,4-butylene glycol thiocollate) | 60 | 70 | 90 |
| Dioctyltin-bis-(ethylene glycol thioglycollate) | 60 | 80 | 90 |

EXAMPLE 4

In a similar manner to Example 3, the same stabilizers were examined in the following formulation:

Emulsion PVC _____ 100
Lubricant _____ 1
Stabilizer _____ 2 the same known compounds being used for comparison of the results obtained.

It should be noted that when using this test with emulsion PVC, appearance of initial color takes place earlier but the development of color is more gradual. The colors are also somewhat different to those obtained with the suspension polymer. For this reason both tables should not be compared.

| Product | Time to color formation (mins.) | | | |
|---|---|---|---|---|
| | Slight yellow | Yellow | Amber | Black |
| Dibutyltin-bis-(octyl thioglycollate) | 45 | 60 | 70 | 80 |
| Dioctyltin-bis-(octyl thioglycollate) | 45 | 70 | 80 | 90 |
| Dibutyltin-bis-(glyceryl thioglycollate) | 20 | 60 | 80 | 100 |
| Dibutyltin-(glyceryl-bis-thioglycollate) | 20 | 60 | 80 | 100 |
| Dibutyltin-bis-(ethylene glycol thioglycollate) | 60 | 90 | 95 | 110 |
| Dibutyltin-bis-(propylene glycol thioglycollate) | 60 | 80 | 90 | 110 |
| Dibutyltin-bis-(2-methoxy ethyl thioglycollate) | 70 | 85 | 95 | 100 |
| Dibutyltin-bis-(ethylene glycol β mercapto propionate) | 20 | 60 | 80 | 100 |
| Dibutyltin-bis-(triethylene glycol thioglycollate) | 20 | 60 | 80 | 100 |
| Dibutyltin-bis-(1,4-butylene glycol thioglycollate) | 50 | 70 | 80 | 90 |
| Dioctyltin-bis-(ethylene glycol thioglycollate) | 60 | 80 | 90 | 100 |

What is claimed is:

1. A resin composition comprising a polymeric vinyl halide resin and a stabilizer in the amount of from 0.5% to 10% by weight of the resin, said stabilizer having the formula

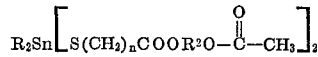

wherein
R is an alkyl group having up to 10 carbon atoms;
$R^2$ is an alkylene group having up to 5 carbon atoms; $-(CH_2-CH_2O)_nCH_2CH_2-$ or $-CH_2CH(CH_3)OCH_2CH(CH_3)-$; and $n=1$ or 2.
2. A resin composition as claimed in claim 1 wherein $R^2$ is
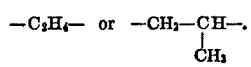
References Cited
UNITED STATES PATENTS
| | | | |
|---|---|---|---|
| 3,398,114 | 8/1968 | Pollock | 260—45.75 |
| 3,525,761 | 8/1970 | Seki et al. | 260—45.75 |
| 3,525,760 | 8/1970 | Seki et al. | 260—45.75 |
DONALD E. CZAJA, Primary Examiner
V. P. HOKE, Assistant Examiner